United States Patent
Bardini et al.

(10) Patent No.: US 10,338,900 B2
(45) Date of Patent: Jul. 2, 2019

(54) METHOD FOR GENERATING SOFTWARE ARCHITECTURES FOR MANAGING DATA

(71) Applicant: SIEMENS AKTIENGESELLSCHAFT, Munich (DE)

(72) Inventors: Matteo Bardini, Genoa (IT); Raffaele Rialdi, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/878,612

(22) Filed: Jan. 24, 2018

(65) Prior Publication Data

US 2018/0210716 A1 Jul. 26, 2018

(30) Foreign Application Priority Data

Jan. 24, 2017 (EP) .................................... 17152875

(51) Int. Cl.
| | |
|---|---|
| G05B 19/05 | (2006.01) |
| G06Q 10/06 | (2012.01) |
| G06F 8/36 | (2018.01) |
| G06Q 50/04 | (2012.01) |

(52) U.S. Cl.
CPC ............ *G06F 8/36* (2013.01); *G05B 19/056* (2013.01); *G06Q 10/06* (2013.01); *G06Q 50/04* (2013.01); *G05B 2219/13004* (2013.01); *Y02P 90/30* (2015.11)

(58) Field of Classification Search
None
See application file for complete search history.

(56) References Cited

U.S. PATENT DOCUMENTS

| | | | | |
|---|---|---|---|---|
| 6,345,259 | B1 * | 2/2002 | Sandoval | G06Q 10/06 700/100 |
| 6,839,713 | B1 * | 1/2005 | Shi | G06Q 10/06 |
| 7,031,784 | B1 * | 4/2006 | Lai | G05B 19/41865 700/121 |
| 2003/0061212 | A1 * | 3/2003 | Smith | G06Q 10/06 |
| 2008/0097623 | A1 * | 4/2008 | Weatherhead | G05B 19/41865 700/3 |
| 2013/0123965 | A1 * | 5/2013 | Cooper | G05B 15/02 700/97 |
| 2013/0124253 | A1 * | 5/2013 | Cooper | G06Q 10/0633 705/7.26 |
| 2014/0359570 | A1 * | 12/2014 | Bortoloso | G06F 8/38 717/109 |
| 2014/0359699 | A1 * | 12/2014 | Colletti | G06F 21/00 726/2 |
| 2015/0142162 | A1 * | 5/2015 | Bayliss | H04L 67/12 700/121 |

(Continued)

FOREIGN PATENT DOCUMENTS

EP 3026609 A1 6/2016

*Primary Examiner* — Isaac T Tecklu
(74) *Attorney, Agent, or Firm* — Laurence Greenberg; Werner Stemer; Ralph Locher

(57) ABSTRACT

A method generates data elaboration software architectures suitable for MES or MOM systems. The method includes providing at least one source program block capable of generating a suitably formatted signal capable of being processed and at least one elaboration program block capable of elaborating the signals generated by the source program blocks.

6 Claims, 2 Drawing Sheets

(56) References Cited

U.S. PATENT DOCUMENTS

| | | | |
|---|---|---|---|
| 2015/0339107 A1* | 11/2015 | Krishnamurthy | G06F 8/34 717/107 |
| 2016/0154912 A1* | 6/2016 | Altare | G06Q 10/06 703/13 |
| 2016/0154913 A1* | 6/2016 | Altare | G06Q 10/06 703/13 |
| 2016/0252899 A1* | 9/2016 | Olmino | G05B 19/41835 700/96 |
| 2018/0041582 A1* | 2/2018 | Rosca | H04L 67/12 |

* cited by examiner

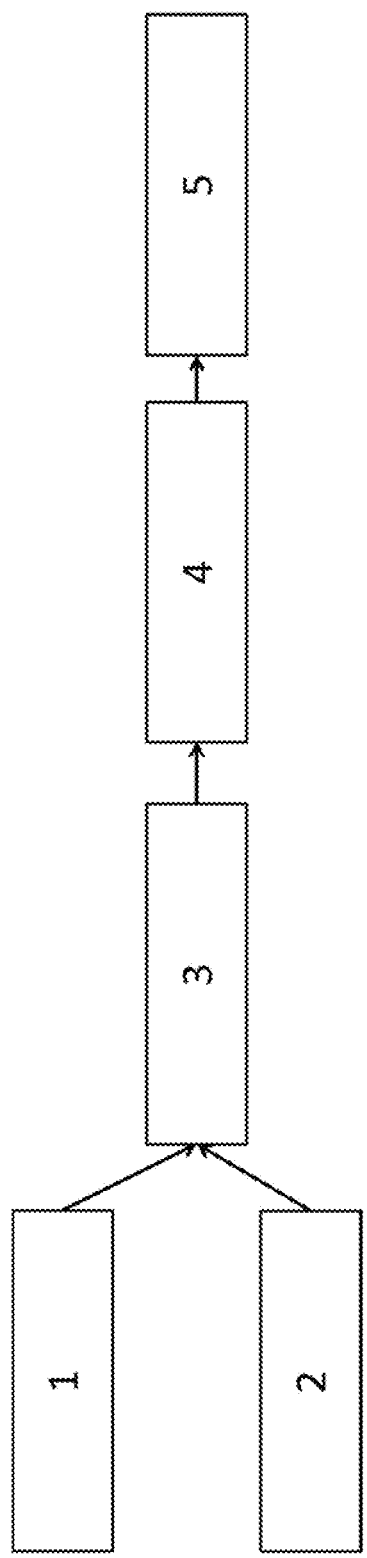
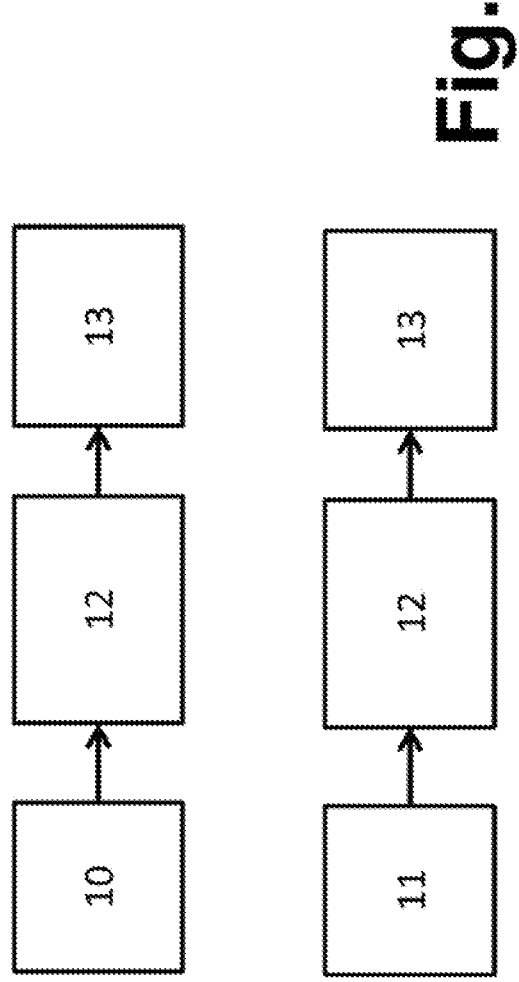

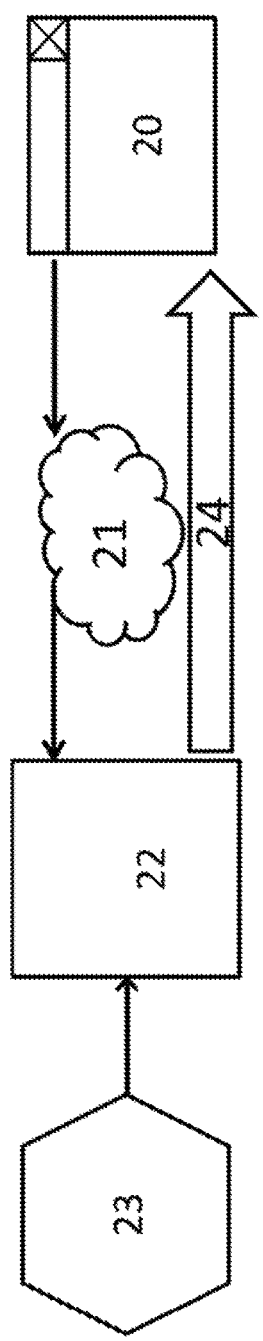
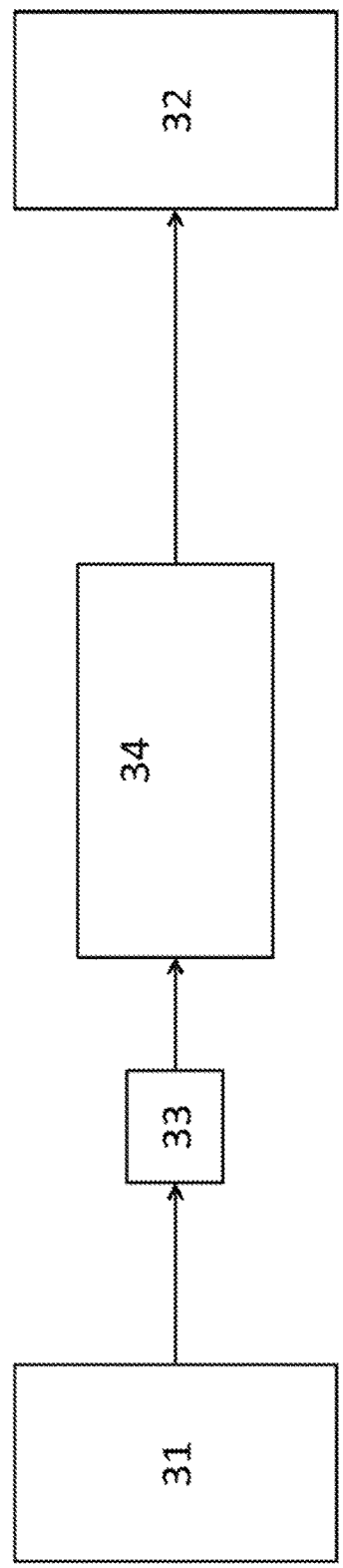

METHOD FOR GENERATING SOFTWARE ARCHITECTURES FOR MANAGING DATA

CROSS-REFERENCE TO RELATED APPLICATION

This application claims the benefit, under 35 U.S.C. § 119, of German patent application EP 17152875.5, filed Jan. 24, 2017; the prior application is herewith incorporated by reference in its entirety.

BACKGROUND OF THE INVENTION

Field of the Invention

The invention relates to a method for generating software architectures for managing input data to be processed by a system, in particular a manufacturing execution system (MES) or a manufacturing operation management (MOM). Most recently, the term MOM is more and more used to replace the term MES.

As defined by the Manufacturing Enterprise Solutions Association (MESA International), a MES/MOM system "is a dynamic information system that drives effective execution of manufacturing operations", by managing "production operations from point of order release into manufacturing to point of product delivery into finished goods" and by providing "mission critical information about production activities to others across the organization and supply chain via bi-directional communication."

The functions that MES/MOM systems usually include, in order to improve quality and process performance of manufacturing plants, are resource allocation and status, dispatching production orders, data collection/acquisition, quality management, maintenance management, performance analysis, operations/detail scheduling, document control, labor management, process management and product tracking.

For example, Siemens Corporation offers a broad range of MES/MOM products under its SIMATIC IT® product family.

Considering a MES environment, a great amount of heterogeneous data is usually produced every day, data that need elaboration.

The first problem is how to collect and elaborate data belonging to different systems and not meant to be aggregated, because there is no integration between the systems that produce them. There could be cases where there is no homogenous representation of the data, or not all the systems represent and handle data in the same way.

A practical example is the comparison of a weight value with a threshold, when the latter is saved on a relational database (an engineering MES database typically is used for storing this type of data), and the former is obtained by reading a specific tag on the equipment (e.g. via a human machine interface (HMI)—to the programmable logic controller (PLC)). Commonly, the HMI world and the MES world will communicate to each other only via a custom application that coordinates both of them. This is even more problematic if the MES and HMI products belong to different producers.

A further problem is that the elaboration often generates an input for a backward propagation, i.e. a feedback, which leads to more articulated processes that need to integrate different logics together.

Currently, the most used approach is to design and develop a custom application for each different scenario that requires a specific analysis on the data. This, however, does not allow data aggregation, elaboration and expression, other than those the application is designed for. Moreover, the opportunity of reusing portions of the developed applications is severely reduced.

The necessity to develop each time not only a business logic, but also a platform to perform it, requires resources (staff and machines) and is expensive, limiting the opportunity to provide solutions to big companies.

Even when different problems could be solved with the same, or a similar logic, the software to be developed cannot be reused, even if the only part to be integrated to the system is the interface that generates the data.

Therefore, the need is felt to provide a method that overcomes the above exposed drawbacks, allowing a better integration between different systems, in particular MES and MOM applications with interfaces and performing different processes by reusing programs or part of programs.

SUMMARY OF THE INVENTION

The above-mentioned problems have now been solved by a method for generating data elaboration software architectures suitable for MES or MOM systems. The method includes providing at least one source program block, capable of generating a suitably formatted signal capable of being processed, and one or more elaboration program blocks, capable of elaborating the signals generated by the source program blocks.

Further elaboration program blocks can be provided to further elaborate data elaborated by other program blocks.

The source program blocks thus are, preferably, only capable of formatting data and transmitting to the elaboration program blocks programs, without any further elaboration.

The elaboration program blocks, directly receive a signal from the source program blocks or are a further elaboration program block (since there is no conceptual difference, the elaboration blocks being capable of receiving a suitably formatted signal from any kind of block) and can be of different kinds, such as transformation program blocks, capable of transforming the signals into different sets of data, filters, aggregators. There can be provided blocks capable, e.g. at the end of the flow diagram, to perform operation such as sending a request, update a database and so on.

According to an embodiment of the invention, the source program blocks can generate signals in response to an event (e.g. an input from an HMI or a sensor) or retrieve data from a database. The formatted data generated can, according to an embodiment of the invention, be signals relating to e.g. changes in the database or the events.

According to a preferred embodiment, each block is capable of receiving one or more signals and output a single signal.

The data flow to a block is, preferably, unidirectional (except in the source program blocks capable of interrogating a database with a suitable pooling functionality).

Thus, each block is suitable to receive data from blocks of different kinds and can be used in different processes, when there is need for the operation the block is designed to perform.

The invention also relates to a method for elaborating data. The method includes the steps of:

generating suitably formatted signals, capable of being processed, by one or more source program blocks; and elaborating the signals generated by the at least one source program block by one or more elaboration program blocks.

The invention further relates to a software architecture capable of performing a method as above defined.

Other features which are considered as characteristic for the invention are set forth in the appended claims.

Although the invention is illustrated and described herein as embodied in a method for generating software architectures for managing data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is a flow diagram of an example software architecture generated according to the invention;

FIG. 2 is a flow diagram of two example software architectures where the source program block is changed;

FIG. 3 is a flow diagram of an environment where a client can use an architecture according to the invention via web; and FIG. 4 is a flow diagram of an example software architecture generated according to the invention, to interface two different informatics products.

DETAILED DESCRIPTION OF THE INVENTION

With reference to FIG. 1, there is described an architecture that simply resolves the above exemplified problem, of the comparison of a weight value with a threshold.

There are two source program blocks, 1 and 2. The first, 1 is capable of receiving data from a PLC, about an operation of reading a tag, or a weighing operation, and the second, 2 is capable of retrieving a weight threshold from an appropriate database. An aggregator 3, aggregates the signals received from both the source program blocks to generate a single set of data in the form of another signal. The filter 4 generates positive outputs if the measured value exceeds the threshold, and a further elaboration program block 5 raises an alarm in case of a positive output from the filter.

It can be easily appreciated that, when the same logic is requested to process different data, as shown in FIG. 2, only the source block or blocks 10 has to be replaced with a suitably developed source program block 11, while the elaboration 12 and possible further elaboration program blocks 13 can be used as they are. In the case of FIG. 1, if another value from another PLC should be compared to a threshold, the source blocks could simply be replaced by another block capable of receiving data from a different PLC and another block capable of retrieving the data from another database, or the same block, configured in order to receive from another PLC or interrogate another database, respectively.

In addition, elaboration program blocks can be simply replaced. In the example of FIG. 1, by replacing block 5 with a block capable of inserting the filtered weigh value in the database read by block 2, replacing the weigh value therein present, the whole pattern is transformed in a process for registering a maximum weigh value among the various reading received by the PLC. This example clarifies how the present invention is suitable to easily generate even feedback architectures by reusing logic blocks.

According to a preferred embodiment, the blocks can be generated as configurable blocks, each based on a generic logic. In case of very generic block, such as a filter for instance, via the configuration it is possible to describe the real behaviour of the block, in terms of the fields of the input signal, the fields upon which to operate, the fields of the output signal.

A non-limitative example of a tool that can be advantageously used to generate blocks is the .NET Compiler Platform, better known by its codename "Roslyn", preferably in combination with the Expression Trees.

According to an embodiment of the invention, each block of a diagram can be 'published' or, better, it's the block output signal that will be published. After the publishing operation, a signal can be subscribed, to activate a diagram, i.e. a software architecture capable of performing a process.

The other way is via the automatic-consumer block, i.e. the diagram will be activated upon each start of the system. Generally, in this case the input signals will be used as the base of an elaboration. An automatic-consumer can cover different scenarios, for instance, it can execute business specific logic (via a custom implementation or integrating with the product engine). A practical example is the following. When it is needed to send an email each time a dispatched order of plan is not completely carried out (and the order contains a description of the problem occurred).

The software may comprise a source block for detecting the order changes, a filter block configured to sort out only the problematic orders and, finally, an already developed (commercial) block capable of sending an email with the problem description contained in the order (this can be made simply configuring the block to specify a specific field of a signal as an email body).

Among the elaboration operations one important example is the aggregation. Two important kinds can be taken into consideration:
a) Aggregation based on data, and
b) Aggregation based on time.

The first one is similar to the "join" concept, i.e. when two signals that share common properties can be merged in a single one containing characteristics of both of the original ones. The second one is a concept typical of reactive programming: since the signals are a flow of data in time, they can be aggregated by time and a result signal can be produced, for instance containing the mean of a numeric field.

A subscription can be performed requesting a specific signal. Upon subscription, the machine, which will be named "signal manager", e.g. a server, which contains the various published blocks and software architecture, seeks the architecture that actually exposes the signal and activates it by configuring the blocks. The subscription can be performed by a client e.g. via web, according to the scheme of FIG. 3. The web client, 20 sends an http request via web 21. The signal manager 22 elaborates it and activates software architecture, enabling the source system 23 to send signals. Each time a change status in the source system 23 generates a signal, e.g. relating to an event or a reading in a database, it is elaborated by the signal manager and sent as an elaborated signal 24 to the client.

Obviously, we can consider also the case of subscription internal to the system (so, not made from the web). For subscriptions, external or internal, an example of suitable way to operate, is to open a permanent connection between signal manager and client via Websocket.

The present invention allows an integrated environment for business events and data changes collection and elaboration.

It reduces costs, by reusing developed software and allowing a simple way of expressing data, thus not requesting particular knowledge regarding how to develop custom blocks or configure existing ones. Actually, the configuration can be made via a graphic tool, without specific software development knowledge thus being more customer oriented.

A signal manager can be configured based on the overall system performance. Since all the blocks are compiled as libraries (e.g. Windows .dll) and not logic parsed and executed at meantime (Interpreted code), it allows a great performance boost with respect to a typical elaboration engine.

It allows integration between existing products, such as in the example of FIG. 4, where a first product 31 generates a signal that must be used by a second product 32. The signal manager, by a source program block 33 formats the fields of the signal produced by the first product and sends a the formatted signal to an elaboration program block where the fields are converted in other fields appropriated for the second product. The signal can possibly be integrated with other fields, if needed (e.g. time of signal generation). Thus, by replacing the source block, the elaboration block can be used to generate signals for the second product from different sources, i.e. first products.

The following is a summary list of reference numerals and the corresponding structure used in the above description of the invention:

1—First source program block
2—Second source program block
3—Aggregator
4—Filter
5—Elaboration program block raising alarms
10—Source program block
11—Source program block
12—Elaboration program block
13—Further elaboration program block
20—Web client
21—Web
22—Signal manager
23—Source system
24—Elaborated signal
31—First product
32—Second product
33—Source program block
34—Elaboration program block

The invention claimed is:

1. A method for generating data elaboration software architectures suitable for a manufacturing execution system (MES) or a manufacturing operation management (MOM) system, which comprises the steps of:
   providing at least one source program block configured for receiving data and generating a signal from the received data; and
   providing at least one elaboration program block configured for elaborating the signal generated by the source program block;
   wherein the source program block is only configured to format the received data and supply the formatted received data to the elaboration program block.

2. The method according to claim 1, which further comprises providing further elaboration program blocks to further elaborate data elaborated by the elaboration program block.

3. The method according to claim 1, wherein the elaboration program block is configured for generating the signal as a single signal with a single set of data.

4. The method according to claim 1, wherein the source program block is configured to receive an event related signal from a programmable logic controller (PLC) or an interface or read a database to generate a signal.

5. The method according to claim 1, wherein the at least one source program block and the elaboration program block are configurable blocks.

6. A method for elaborating data, which comprises:
   by at least one source program block, receiving data and generating a signal from the received data;
   by at least one elaboration program block, elaborating the signal generated by the source program block;
   wherein the source program block is only configured to format the received data and supply the formatted received data to the elaboration program block.

* * * * *